United States Patent
Kaufmann et al.

(10) Patent No.: US 10,024,540 B2
(45) Date of Patent: Jul. 17, 2018

(54) COMBUSTION CHAMBER FOR A GAS TURBINE

(75) Inventors: Peter Kaufmann, Moers (DE); Werner Krebs, Mülheim an der Ruhr (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 1250 days.

(21) Appl. No.: 12/524,775

(22) PCT Filed: Jan. 24, 2008

(86) PCT No.: PCT/EP2008/050833
§ 371 (c)(1),
(2), (4) Date: Jul. 28, 2009

(87) PCT Pub. No.: WO2008/092795
PCT Pub. Date: Aug. 7, 2008

(65) Prior Publication Data
US 2010/0058732 A1    Mar. 11, 2010

(30) Foreign Application Priority Data
Jan. 29, 2007  (EP) .................................. 07001911

(51) Int. Cl.
| | |
|---|---|
| F23R 3/50 | (2006.01) |
| F23C 9/00 | (2006.01) |
| F23R 3/28 | (2006.01) |
| F23R 3/34 | (2006.01) |

(52) U.S. Cl.
CPC ................ *F23R 3/50* (2013.01); *F23C 9/006* (2013.01); *F23R 3/286* (2013.01); *F23R 3/34* (2013.01); *F23C 2900/09002* (2013.01); *F23C 2900/99001* (2013.01); *F23R 2900/03282* (2013.01); *Y02E 20/342* (2013.01)

(58) Field of Classification Search
USPC ......... 60/749, 750, 737, 738, 739, 740, 743, 60/746
See application file for complete search history.

(56) References Cited

U.S. PATENT DOCUMENTS

4,062,182 A * 12/1977 Fehler et al. ................ 60/737
5,323,614 A * 6/1994 Tsukahara et al. ........... 60/737

FOREIGN PATENT DOCUMENTS

| | | |
|---|---|---|
| DE | 102005008421 A1 | 8/2006 |
| JP | 59173633 A | 10/1984 |
| JP | 7019482 A | 1/1995 |
| JP | 11337069 A | 12/1999 |
| JP | 2002257344 A | 9/2002 |
| WO | WO 03091626 A1 | 11/2003 |
| WO | WO 2004053395 A1 | 6/2004 |
| WO | WO 2006094896 A1 | 9/2006 |

* cited by examiner

*Primary Examiner* — Arun Goyal

(57) ABSTRACT

A combustion chamber for a gas turbine is provided. The combustion chamber comprises at least one first and one second jet carrier, of which at least one is provided for injecting an operating gas in the combustion chamber such that waste gas formed in the flame zone thereof is circulated to a mixing zone of the first jet carrier. In order to achieve a compact combustion chamber, the jet carriers are positioned in relation to each other such that waste gas from the flame zone of the first jet carrier flows directly to the mixing zone of the second jet carrier.

10 Claims, 2 Drawing Sheets

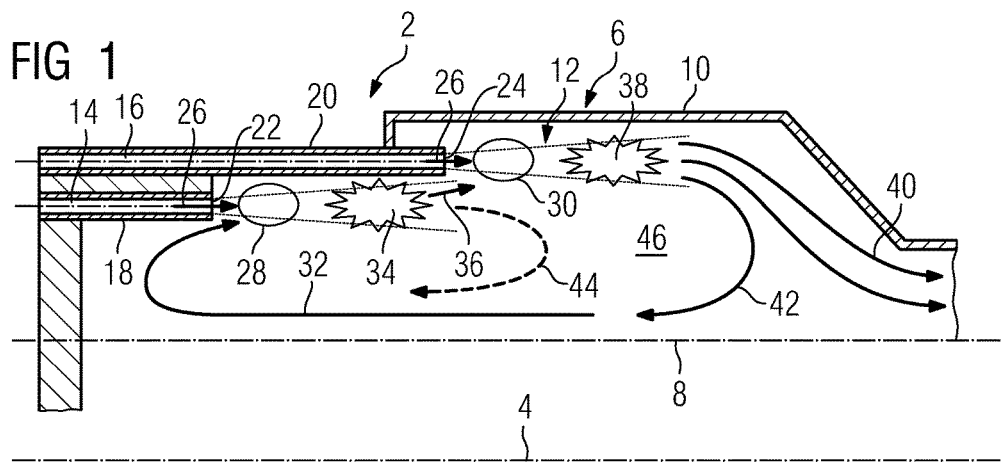
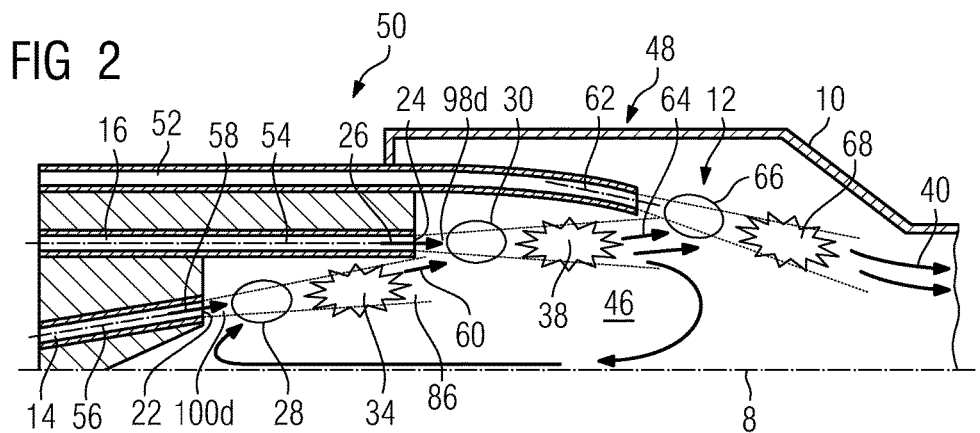
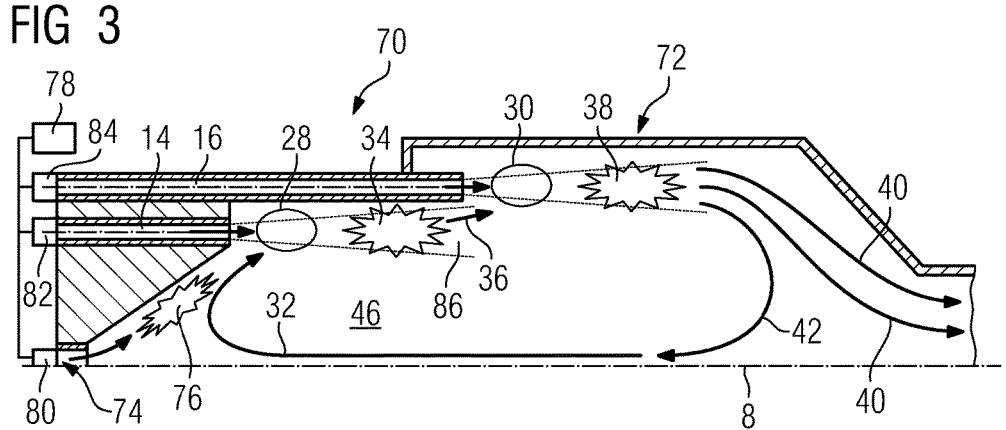

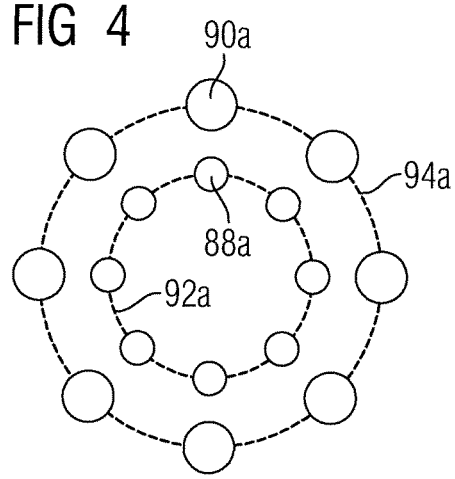
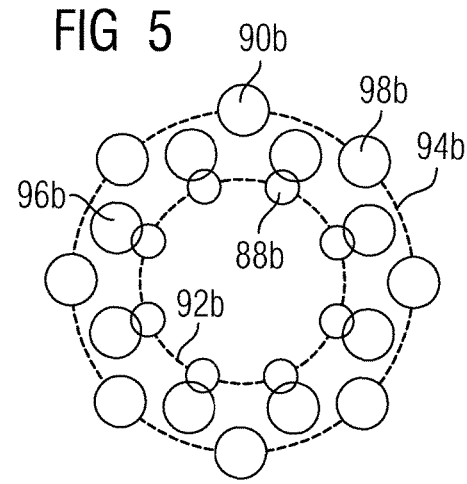
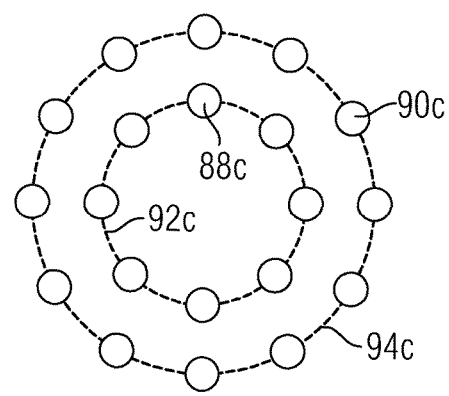
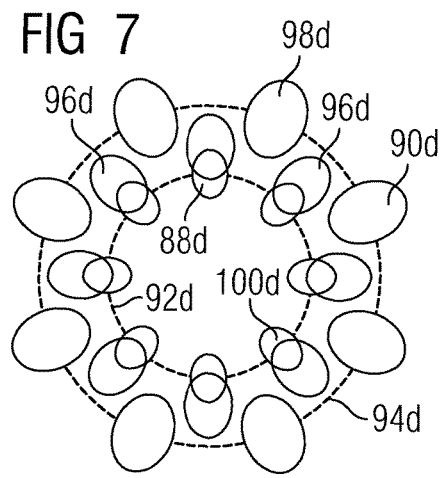

COMBUSTION CHAMBER FOR A GAS TURBINE

CROSS REFERENCE TO RELATED APPLICATIONS

This application is the US National Stage of International Application No. PCT/EP2008/050833, filed Jan. 24, 2008 and claims the benefit thereof. The International Application claims the benefits of European application No. 07001911.2 EP filed Jan. 29, 2007, both of the applications are incorporated by reference herein in their entirety.

FIELD OF INVENTION

The invention relates to a combustion chamber for a gas turbine having at least one first and one second jet carrier at least one of which is provided for injecting an operating gas in such a way into a combustion space that waste gas formed in its flame zone in the combustion space will be recirculated into a mixing zone of the first jet carrier.

BACKGROUND OF INVENTION

For achieving quiet and stable combustion in a gas turbine it is known how to inject operating gas in the form of combustion gas and air premixed by jet carriers into a combustion space, as a result of which very lean combusting with a low accrual of noxious constituents, particularly $NO_x$ and CO, can be produced. Compared with spin-stabilized systems, combustion systems of such type based on premixed jet flames offer the advantage that variations in heat release and hence in density or, as the case may be, pressure can be kept low. Unstable and loud combustion can be avoided. Suitably selecting the jet pulse allows small-scale flow structures to be produced that will dissipate acoustically induced heat-release fluctuations and so suppress pressure pulsations that typify spin-stabilized flames.

Combustion stabilizing accompanied by attaining a very high efficiency level and low production of harmful substances can therein be achieved by very heavily diluting the operating gas with waste combustion gases. Instead of there being a visible flame front, non-luminous combustion will take place that is known also as mild, colorless, or volume combustion. A high volume flow of waste gas into the combustion zone can therein be achieved by recirculating waste combustion gases, which preferably takes place inside the combustion space. The recirculated waste combustion gases will dilute the fresh gas brought into the combustion space and also cause the resulting gas mixture to become highly preheated to temperatures above a self-ignition temperature of the operating gas. Instead of a conventional flame front, a voluminous flame zone will be achieved within whose volume virtually even combusting takes place.

Known from DE 10 2005 008 421 A1 is a combustion chamber for a gas turbine, in which chamber waste gas from a combustion process is ducted by means of recirculating into a mixing zone and volume combustion thereby achieved.

SUMMARY OF INVENTION

Recirculating is generally achieved by abruptly expanding the combustion chamber's flow cross-section around the outlet of the jet carriers so that combustion takes place in a space whose cross-section exceeds the jet carrier's outlet cross-section by a multiple. At the side of the jet-carrier outlet there is hence sufficient space through which the hot waste gas will be able to flow back counter to the jet carrier's jet direction and thus reach the mixing zone. A consequently necessary large combustion-space cross-section will impede designing a compact turbine. A large combustion-space cross-section can furthermore cause the gases to have a lengthy dwell time within the combustion space, which will promote the undesired development of nitrogen oxide.

An object of the present invention is to disclose a combustion chamber for a gas turbine that will allow the possibility of volume combustion by means of recirculated waste gas in conjunction with a compact design.

This object is achieved by means of a combustion chamber of the type cited in the introduction in which the jet carriers are inventively mutually positioned such that waste gas from a flame zone of the first jet carrier will flow directly into a mixing zone of the second jet carrier and with direct flowing of the waste gas from the first flame zone (34) into the mixing zone (30) of the second jet carrier (16) allowing flame-stabilizing to be achieved there by means of the hot waste gas with no recirculating of the waste gas.

The waste gas from the flame zone of the first jet carrier can thereby be used directly for stabilizing the combustion of the operating gas from the second jet carrier without the need to recirculate said waste gas for reaching the second jet carrier's mixing zone. The second jet carrier's flame can be stabilized in that way. The first jet carrier's flame can be stabilized by the recirculated waste gas. The recirculation zone can be kept small because only waste gas for the first jet carrier's flame has to be recirculated. Recirculating of waste gas for the second jet carrier's flame can be dispensed with.

What is in this context understood by flowing directly into the second jet carrier's mixing zone is that the waste gas flows from the first jet carrier's flame zone into the second jet carrier's mixing zone without any recirculating. The waste gas from the first jet carrier's flame zone can be waste gas that was formed there through combustion.

To enable the waste gas to flow directly from the first flame zone into the second mixing zone without any external waste-gas ducting, the first jet carrier is expediently located in the combustion chamber upstream of the second jet carrier. The first jet carrier's flame zone is with the same advantage expediently located in the combustion chamber upstream of the second jet carrier's mixing zone.

To avoid undesired thermo-acoustic effects, the jet carriers advantageously form a jet burner. That can be characterized by essentially turbulence-free injecting of the operating gas into the combustion space. For producing homogeneous and lean combustion, the jet carriers are advantageously provided for injecting a premixed operating gas, meaning a mixture that is mixed prior to injection, which includes in particular gaseous fuel and oxidans, especially air. The operating gas is hence mixed not in the combustion space but inside the jet carriers or in front of the jet carriers. Mixing can be partial or, ideally, complete. It is also conceivable for a mixture to be encased in air in the form, for instance, of having the operating gas flow through the innermost 15% to 85% of the operating-gas jet's cross-sectional area and air flow through the remaining cross-sectional area around the outside.

In a further embodiment of the invention a plurality of first jet carriers form an annular first stage and a plurality of second jet carriers an annular second stage located further downstream of the first stage and radially outside it. It is possible to form a radially inner recirculating space from which the waste gas is ducted stably and symmetrically to the mixing zones of the first zone's jet carriers. Without having to be substantially deflected, the gas flow can during its further course be ducted from the first jet carriers' flame zones into the mixing zones of the second stage's second jet carriers with the annular symmetry being maintained. The number of jet carriers in each stage is expediently between 5 and 40, with an advantageous relationship between good combustion and the expenditure for jet carriers being provided by 12 to 16 jet carriers.

To achieve good mixing of the operating gas injected from the second jet carriers with the waste gas from the first jet carriers' flame zones it is advantageous for at least one jet carrier of the first stage to be arranged tangentially offset between two jet carriers of the second stage. The waste gas from the first jet carrier's flame zone can flow in between two jets from the two second jet carriers and so mix well with said jets. A direct collision between a waste-gas flow from the first stage and an operating-gas flow from the second stage and hence a kind of bouncing-off of the gases from each other can be kept low. All the first stage's jet carriers are expediently tangentially offset with respect to jet carriers of the second stage and are in particular arranged in alternating fashion in the tangential direction so that the waste gas from the first jet carriers' flame zones can basically flow in between jets of the second jet carriers.

In a further embodiment of the invention the first jet carrier is oriented at an angle of 5° to 30° radially with respect to the second jet carrier. The waste gas from the first jet carrier's flame zone can thus be directed straight onto the second jet carrier's mixing zone so that good mixing of the particularly premixed operating gas with the waste gas will take place there. An angle of between 10° and 20° is preferably selected so that on the one hand the design of the combustion space can be particularly compact and, on the other, turbulences can be kept small if the waste gases and operating gas meet too steeply.

The angle of the first jet carrier corresponds expediently to the angle of the gas jet exiting the first jet carrier. The first jet carrier can therein be oriented relative to the burner axis radially outwardly toward the second jet carrier or a second stage. It is likewise possible for the second jet carrier or, as the case may be, jet carriers of a second stage to be oriented radially inwardly relative to the burner axis and for the first jet carrier or, as the case may be, the jet carriers of a first stage to be oriented for example coaxially with respect to the burner axis. Three jet carriers or, as the case may be, three stages are furthermore conceivable, with the second jet carrier being directed, for example, coaxially, the first jet carrier radially outwardly, and the third jet carrier radial inwardly, referred in each case to the burner axis.

To achieve good mixing of waste gas from the first jet carrier's flame zone with operating gas from the second jet carrier it is advantageous for the waste gas to be ducted over as wide an area as possible to the operating-gas jet and even advantageously to encompass it a little wide thereof. If a jet carrier for injecting an operating-gas jet is provided with an oblong jet cross-section, then a waste-gas jet from the first jet carrier can be injected particularly well between two operating-gas jets of two second jet carriers. At least partial encompassing of the operating-gas jets with hot waste gas can be promoted.

The long axis of the oblong jet cross-section expediently is therein at least substantially radially oriented for example toward another stage. The cross-section can be oval or have another suitable, rounded shape. It is possible to shape the cross-section of a waste-gas jet from the first jet carrier in oblong fashion so that it can be ducted particularly well between the second jet carriers' operating-gas jets. It is likewise conceivable for the second jet carriers to be embodied for forming an operating-gas jet that is oblong in cross-section so that a waste-gas jet, in particular likewise oblong in cross-section, from a first jet carrier can be ducted particularly well between the second jet carriers' operating-gas jets.

Mixing of operating gas with hot waste gas can further be promoted if an operating-gas jet requiring to be mixed has a large jet surface. At least one jet carrier can therein be provided with a means for forming a jet surface that is concave in jet cross-section. A convex jet surface is likewise conceivable.

When the combustion chamber is being operated under a partial load it can happen that, owing to low combustion temperatures, the required portion of recirculated waste gases compared with operation under a basic load will be high in relative terms and, because of reduced waste-gas production, insufficient waste gas will be recirculated and hence insufficient heat made available for self-ignition. That disadvantage can in a further embodiment variant of the invention be counteracted by an additional means for forming a flame zone in a recirculation zone. The additional means can be a pilot burner, for example a FLOX burner or a twist burner.

What can also occur during operation under a partial load is the problem that insufficient hot waste gas will be produced in the first jet carrier's flame zone for adequately stabilizing the second jet carrier's flame. That problem can be counteracted by setting the ratio of combustion gas flowing through the jet carriers during operation under a partial load such that adequate stabilizing of the second flame zone will as far as possible always be attained. Combustion-gas distributing of such kind between the two jet carriers can be attained by means of a system having a combustion chamber as described above and a control unit provided for controlling a distribution of combustion gas between the two jet carriers as a function of a load or, as the case may be, a load range of an operation of the gas turbine.

The control unit is therein advantageously provided for ducting more operating gas through the first relative to the second jet carrier when the gas turbine is operating under a partial load than when it is operating under a basic or, as the case may, full load. More waste gas from the first jet carrier's flame zone will be available referred to an amount of operating gas from the second jet carrier so that the second jet carrier's flame zone will be adequately stabilized despite a reduction in power. The relative reduction in the flow of operating gas through the second jet carrier can be to the extent that the flow of operating gas through the second jet carrier is brought to a halt, whereas the first jet carrier's operation will continue to be maintained. It is also conceivable for a first stage to be operated with a high flow rate of operating gas, a second stage to be operated with a lower rate, and a further stage to be operated with an even lower flow rate of operating gas.

The invention is directed also at a gas turbine having a combustion chamber as described above. Through combining recirculating on the one hand and, on the other, direct injecting of waste gas from the first jet carrier's flame zone into the second jet carrier's mixing zone, a recirculating space can be kept small and the combustion chamber can be of compact design, which is particularly advantageously applied to a gas turbine.

BRIEF DESCRIPTION OF THE DRAWINGS

The invention will be explained in more detail with the aid of exemplary embodiments that are shown in the drawings:

FIG. 1 shows in a longitudinal section along a shaft axis a part of a gas turbine having a combustion chamber, FIG. 2 shows in a longitudinal section an alternative combustion chamber having three stages of jet carriers, FIG. 3 shows a further combustion chamber having two stages of jet carriers, an additional pilot burner, and a control unit for controlling a supply of operating gas to the two stages, and FIGS. 4-7 are four schematics of arrangements of jet carriers of two stages shown in a cross-section.

DETAILED DESCRIPTION OF INVENTION

FIG. 1 shows in a longitudinal section a part of a gas turbine 2 having a shaft that is arranged along a shaft axis 4, though not shown, and a combustion chamber 6 oriented parallel to the shaft axis 4. The combustion chamber 6 is constructed rotationally symmetrically around a combustion-chamber axis 8. The combustion-chamber axis 8 is in that specific exemplary embodiment arranged parallel to the shaft axis 4, with its also being possible for it to be bent with respect to the shaft axis 4 or, in an extreme instance, to run perpendicular thereto. An annular housing 10 of the combustion chamber 6 encompasses a combustion space 12 embodied likewise rotationally symmetrically around the combustion-chamber axis 8.

Feeding into the combustion space 12 are a first jet carrier 14 and a second jet carrier 16 that are provided for injecting premixed operating gas, for example a mixture of combustion gas and air, into the combustion space 12. The jet carriers 14, 16 each include a pipe 18, 20 through which the operating gas flows into the combustion space 12 at a speed of around 150 m/s while the gas turbine 2 is operating under a full load. The first jet carrier 14 is one of 12 jet carriers 14 that are arranged annularly around the combustion-chamber axis 8 and together form a first stage of a jet burner. The second jet carrier 16 is likewise one of a set of 12 annularly arranged jet carriers that are arranged radially outside the first jet carriers 14 around the combustion-chamber axis 8 and form a second stage of the jet burner.

The combustion space 12 is formed at outlets 22, 24 of the jet carriers 14, 16 in such a way as to have in an injecting direction 26 of the operating gas a jump in cross-section through which the gas in the combustion space 12 can flow laterally toward the operating gas exiting the outlets 22, 24 and mix with the operating gas in each case in a mixing zone 28, 30.

The premixed operating gas from the two jet carriers 14, 16 is injected into the combustion space 12 while the gas turbine 2 is operating. The operating gas from the first jet carrier 14 reaches the first mixing zone 28 and is washed around there by recirculated waste gas of a waste-gas flow 32. The operating gas is thereby mixed in the mixing zone 28 with the very hot waste gas in a ratio of, for instance, one part operating gas to four parts recirculated waste gas so that a mixture of operating gas and waste gas is produced whose temperature is above the self-ignition temperature. The mixture ignites in a downstream flame zone 34, which in FIG. 1 is for the sake of clarity shown separately from the mixing zone 28 but in reality merges into it. The result is a voluminous flame space exhibiting quiet combustion.

Through flowing in the flow direction 36, waste gas formed in the flame zone 34, meaning combusted operating gas, reaches the second mixing zone 30 in which it mixes with the operating gas flowing out of the second jet carrier 16. The result is in turn an ignitable mixture that will be combusted in a second flame zone 38 formed analogously to the first flame zone 34. The waste gas developing and having accumulated in said flame zone 38 exits the combustion space 12 partly in a waste-gas flow 40 in which the waste gas is ducted to a section (not shown) of the gas turbine 2. Another portion is recirculated in a recirculating flow 42 to the mixing zone 28 and serves there or, as the case may be, in the flame zone 34 to effect flame-stabilizing. Recirculating is maintained because the combustible gas mixture flowing quickly through the first stage's jet carriers 14 draws in the hot waste gases owing to the static pressure difference resulting from the high exiting speed.

Mixing causes a temperature to be attained that will enable stable combustion in the flame zone 34. Depending on how the waste gases from the flame zone 34 are oriented, they will be ducted entirely to the mixing zone 30 or a part of them will be recirculated in a recirculating flow 44 likewise to the mixing zone 28.

Because the waste gas from the first flame zone 34 is injected directly in the flow direction 36 into the mixing zone 30, flame-stabilizing by the hot waste gas can be attained there without the need to recirculate said waste gas. Expressed in general terms, the required recirculated waste-gas mass flow is kept small by using the hot waste gases of one stage for flame-stabilizing in a following stage. Compared with a single-stage implementation during full-load operation, a portion of only 20% to 70%, for example 50%, of the premixed operating gas injected through the jet carriers 14, 16 will be stabilized by recirculated waste gases. The second stage located axially downstream will be stabilized via the hot waste gases of the stage that is located axially upstream referred to the combustion-chamber axis 8.

All that is recirculated is the waste gas required by jet carriers 14 for flame-stabilizing the first stage.

A recirculation zone 46 can as a result be implemented as being relatively small and the combustion chamber 6 or, as the case may be, gas turbine 2 as being compact. Because of the small size of the recirculation zone 46, the average dwell time of waste gas within the combustion space 12 will be short and the development of nitrogen oxide low. Arranging the mixing zone 28 and flame zone 34 upstream of the mixing zone 30 of the second jet carrier 16 will allow low-turbulence jet, flame, and waste-gas ducting to be achieved within the combustion space 12.

FIG. 2 shows a part of a combustion chamber 48 of a gas turbine 50 having a combustion-chamber axis 8 arranged perpendicularly to a shaft axis (not shown) of the gas turbine 50. The description that follows is limited substantially to the differences compared with the exemplary embodiment shown in FIG. 1, to which embodiment reference is made in terms of unchanged features and functions. Substantially unchanged components have basically been assigned the same reference numerals/letters.

In addition to first and second jet carriers 14, 16 of the first and second stage, the combustion chamber 48 includes jet carriers 52 that are arranged annularly radially outside the second stage and form a third stage of the jet burner that is arranged symmetrically around the combustion-chamber axis 8. Whereas the carrier axis 54 of the second jet carrier 16 is oriented parallel to the combustion-chamber axis 8 and hence the flow direction 26 from the outlet 24 of the second jet carrier 16 likewise runs substantially parallel to the combustion-chamber axis 8, a carrier axis 56 of the first jet carrier 14 is tilted approximately 10° radially outwardly relative to the combustion-chamber axis 8 and toward the second stage. All jet carriers 14 of the first stage are in that way tilted radially outwardly toward the second stage. An injecting direction 58 and, consequently, a flow direction 60 of the waste gas from the flame zone 34 is oriented directly toward the second mixing zones 30 of the second jet carriers 16 for directly injecting the waste gas into the mixing zones 30. Particularly good mixing of the operating gas from the second jet carriers 16 with the hot waste gas from the flame zone 34 will be achieved thereby.

A carrier axis 62 of the third jet carriers 52 is analogously oriented tilted 10° radial inwardly toward the combustion-chamber axis 8 so that a flow direction 64 of waste gas from the second flame zone 38 is oriented directly toward a mixing zone 66 of the jet carriers 52 of the third stage. Flame-stabilizing of combustion in a third flame zone 68 without recirculating the waste gases can be achieved thereby.

With that three-stage arrangement it is only necessary to recirculate hot waste gas for flame-stabilizing the first stage, whereas the second and third stage can be flame-stabilized without any recirculating and through direct injecting of hot waste gas from the stages located upstream. The recirculation zone 46 can be kept relatively small thereby.

To further improve flame-stabilizing with a compact design for the gas turbine it is possible to provide more than three stages. Four and even five stages cascaded one behind the other are conceivable, with only the waste gas for the first stage being recirculated and the waste gas for flame-stabilizing the following stages being provided by the directly injected waste gas from the preceding stage.

FIG. 3 shows a further exemplary embodiment of a gas turbine 70 having a combustion chamber 72 that has jet burners 14, 16 arranged in two-stage fashion. In contrast to the exemplary embodiment shown in FIG. 1, the combustion chamber 72 includes a means 74 for forming a flame zone 76 in the recirculation zone 46. When the gas turbine 70 is being operated under a partial load, with only relatively small amounts of hot waste gas then being produced, the waste-gas flow 32 can thereby be reinforced by an additional heat contribution or, as the case may be, waste-gas contribution from the flame zone 76. Sufficient hot waste gas for flame-stabilizing the first stage will in that way also be available during operation under a partial load.

A control unit 78 in conjunction with a controllable valve 80 therein regulates an operating-gas flow through the means 74 that can be embodied as a pilot burner. If piloting—for example in the case of operation under a full load—is not necessary, then the supply of operating gas from the means 74 can be deactivated with the aid of the valve 80. By means that are not shown, for example sensors, operating parameters are registered in the combustion chamber 72 and, in the case of operation under a partial load, the metric for advantageous piloting by the control unit 78 in conjunction with the valve 80 ascertained and a suitable supply of operating gas controlled by the means 74.

To further improve operation under a partial load, the gas turbine 70 includes further valves 82, 84 on the first or, as the case may be, second jet carriers 14, 16. A distribution of operating gas between the two stages can be advantageously controlled thereby. Thus in the case of operation under a partial load the supply of operating gas through the second stage can be choked to a greater extent than a supply of operating gas through the first stage so that the supply of hot gases in a waste-gas jet 86 will always suffice for good flame-stabilizing of the second stage. Should substantial choking of the operating-gas flow of the first stage be necessary owing to a further load reduction, the waste-gas flow 32 will be reinforced by the piloting so that a sufficient supply of waste gas and heat to the mixing zone 28 and, thereby, indirectly to the mixing zone 30 will continue to be insured. A supply of operating gas through the two stages can in that way be controlled or, if suitable sensors are present, regulated as a function of a load range of the gas turbine 80. That principle of course applies also to the gas turbines 2, 50 in the preceding exemplary embodiments.

FIGS. 4 to 7 show, in a schematic top view, principles for arranging outlets 88a-d, 90a-d of first inner and second outer jet carriers. Said principles can be applied also to other numbers or geometries of jet carriers and to more than two stages. The outlets 88a-d of the first jet carriers are in each case arranged on a radially inner circle 92a-d and the outlets 88a-d of the second jet carriers on a radially outer circle 94a-d.

Each inner outlet 88a of the first stage is in the exemplary embodiment shown in FIG. 4 assigned an outer outlet 90a of the second stage so that substantially waste gas from a jet carrier of the first stage serves to flame-stabilize a jet carrier of the second stage.

In FIG. 5, the first jet carriers or, as the case may be, their outlets 88b are each arranged tangentially offset centrally between two jet carriers or, as the case may be, their outlets 90b. Waste-gas jets 96b of the first stage that result therefrom will, owing to tangential offsetting, pass between operating-gas jets 98b of the second stage. The latter will consequently be encompassed by the waste-gas jets 96b, as a result of which the operating gas flowing therein will be mixed particularly well with hot waste gas from the waste-gas jets 96b.

In FIG. 6 the outlets 88c, 90c of the two stages are arranged substantially equidistantly so that there is no direct assignment of the outlets 88c of the first stage to the outer outlets 90c of the second stage. What, though, is achieved by the uneven tangential arrangement of the inner outlets 88c with respect to the outer outlets 90c is good mixing of waste-gas jets from the inner jet carriers with the operating-gas jets of the outer jet carriers. There being more second than first jet carriers, the jet carriers can all be the same size with the same gas flow per volume of combustion-gas space being maintained.

FIG. 7 shows outlets 88d, 90d having an oblong cross-section oriented radially with reference to the combustion-chamber axis 8 so that the operating-gas jets 98d, 100d flowing therefrom will have a likewise oblong jet cross-section. Waste-gas jets 96d of the first stage that result from operating-gas jets 100d of the first jet carriers will consequently be analogously oval in shape and, owing to tangential offsetting of the outlets 88d, 90d, pass between the operating-gas jets 98d. The latter will consequently be encompassed over a wide area by the waste-gas jets 96d, as a result of which the operating gas flowing therein will be mixed particularly well with hot waste gas from the waste-gas jets 96d.

In a further embodiment variant only the outlets of one stage, one outer or one inner stage, can be implemented having oblong cross-sections so that a, for example, oval waste-gas flow will pass through circular operating-gas flows, or a circular waste-gas flow will pass between oblong operating-gas flows.

It is likewise conceivable for operating-gas jets having concave jet surfaces to be emitted, as a result of which a surface enlargement will be achieved and waste gas will be able to engage particularly well with the operating-gas jets and mix well there.

The radial inclination of jet carriers 14, 16, 52 of one stage with respect to jet carriers 14, 16, 52 of another stage can, of course, also be applied to the exemplary embodiments shown in FIGS. 1 and 4. The principle of tangential offsetting, of oblong and/or concave jet cross-sections, and of controlling by the control unit 78 can likewise be applied to all exemplary embodiments shown and to further stages.

The invention claimed is:

1. An annular combustion chamber for a gas turbine, comprising:
an annular housing about an axis extending in a longitudinal direction;
a combustion space defined within the housing;
a plurality of first jet carriers arranged about and separated from the axis and extending in the longitudinal direction;
a plurality of second jet carriers arranged radially outward of and coaxial with the plurality of first jet carriers and extending in the longitudinal direction, wherein the plurality of first et carriers inject an operating gas in a first mixing zone in the longitudinal direction,
wherein the plurality of second jet carriers inject further of the operating gas in a second mixing zone in the longitudinal direction downstream of the first mixing zone,
wherein a waste gas from a second flame zone formed downstream of the second mixing zone recirculates to the first mixing zone and establishes a first flame zone downstream of the first mixing zone,
wherein a waste gas from the first flame zone flows directly into and mixes in the second mixing zone,
wherein the operating gas injected into the combustion space comprises a fuel-air mixture premixed u stream of the annular combustion chamber and provided as a premixed operating gas to the plurality of first jet carriers and the plurality of second jet carriers,
wherein flame-stabilizing is achieved in the second mixing zone using the waste gas from the first flame zone,
wherein injection points of the plurality of second jet carriers are located in the combustion chamber downstream of the first flame zone, and
wherein the plurality of first jet carriers form an annular first combustion stage and the plurality of second jet carriers form an annular second combustion stage located downstream of the annular first combustion stage and radially outside of the annular first combustion stage.

2. The combustion chamber as claimed in claim 1, wherein an additional means is used to form a flame zone in a recirculation zone.

3. The combustion chamber as claimed in claim 1, wherein a number of the plurality of first jet carriers in the annular first combustion stage is less than a number of the plurality of second jet carriers in the annular second combustion stage.

4. The combustion chamber as claimed in claim 1, wherein an injecting direction for the plurality of first jet carriers is parallel to an injecting direction for the plurality of second jet carriers.

5. The combustion chamber as claimed in claim 1, wherein a number of the plurality of first jet carriers in the annular first combustion stage is same as a number of the plurality of second jet carriers in the annular second combustion stage.

6. A gas turbine, comprising: an annular combustion chamber, comprising:
an annular housing about an axis extending in a longitudinal direction;
a combustion space defined within the housing;
a plurality of first jet carriers arranged about and separated from the axis and extending in the longitudinal direction;
a plurality of second et carriers arranged radially outward of and coaxial with the plurality of first jet carriers and extending in the longitudinal direction;
wherein the plurality of first jet carriers inject an operating gas in a first mixing zone in the combustion space in the longitudinal direction,
wherein the plurality of second jet carriers inject further of the operating gas in a second mixing zone in the longitudinal direction downstream of the first mixing zone,
wherein a waste gas from a second flame zone formed downstream of the second mixing zone recirculates to the first mixing zone and establishes a first flame zone downstream of the first mixing zone,
wherein a waste gas from the first flame zone flows directly into and mixes in the second mixing zone,
wherein the operating gas injected into the combustion space comprises a fuel-air mixture premixed upstream of the annular combustion chamber and provided as a premixed operating gas to the plurality of first jet carriers and the plurality of second jet carriers,
wherein flame-stabilizing is achieved in the second mixing zone using the waste gas from the first flame zone,
wherein injection points of the plurality of second jet carriers are located in the combustion chamber downstream of the first flame zone, and
wherein the plurality of first jet carriers form an annular first combustion stage and the plurality of second jet carriers form an annular second combustion stage located downstream of the annular first combustion stale and radially outside of the annular first combustion stage.

7. The gas turbine as claimed in claim 6, wherein the plurality of first jet carriers and the plurality of second jet carriers form a jet burner.

8. The gas turbine as claimed in claim 6, wherein an injecting direction for the plurality of first jet carriers is parallel to an injecting direction for the plurality of second jet carriers.

9. The gas turbine as claimed in claim 6, wherein a number of the plurality of first jet carriers in the annular first combustion stage is same as a number of the plurality of second jet carriers in the annular second combustion stage.

10. The gas turbine as claimed in claim 6, wherein a number of the plurality of first jet carriers in the annular first combustion stage is less than a number of the plurality of second jet carriers in the annular second combustion stage.

* * * * *